(12) United States Patent
Hu et al.

(10) Patent No.: US 11,067,881 B2
(45) Date of Patent: Jul. 20, 2021

(54) LIGHT SOURCE SYSTEM AND PROJECTION SYSTEM USING SAME

(71) Applicant: APPOTRONICS CORPORATION LIMITED, Guangdong (CN)

(72) Inventors: Fei Hu, Shenzhen (CN); Zuqiang Guo, Shenzhen (CN); Peng Du, Shenzhen (CN); Yi Li, Shenzhen (CN)

(73) Assignee: Appotronics Corporation Limited, Guangdong (CN)

( * ) Notice: Subject to any disclaimer, the term of this patent is extended or adjusted under 35 U.S.C. 154(b) by 0 days.

(21) Appl. No.: 16/650,854

(22) PCT Filed: Dec. 6, 2017

(86) PCT No.: PCT/CN2017/114751
§ 371 (c)(1),
(2) Date: Mar. 25, 2020

(87) PCT Pub. No.: WO2019/061821
PCT Pub. Date: Apr. 4, 2019

(65) Prior Publication Data
US 2020/0285137 A1    Sep. 10, 2020

(30) Foreign Application Priority Data
Sep. 26, 2017    (CN) .......................... 201710881536.2

(51) Int. Cl.
*G03B 21/20*    (2006.01)
(52) U.S. Cl.
CPC .........  *G03B 21/204* (2013.01); *G03B 21/208* (2013.01); *G03B 21/2053* (2013.01); *G03B 21/2066* (2013.01)
(58) Field of Classification Search
CPC ...... G03B 21/00–64; H04N 9/31–3197; G02B 26/008
See application file for complete search history.

(56) References Cited

U.S. PATENT DOCUMENTS

2011/0242497 A1* 10/2011 Fukano ................ G03B 21/145
                                                        353/31
2014/0211169 A1    7/2014 Kitano et al.
(Continued)

FOREIGN PATENT DOCUMENTS

CN    104820334 A    8/2015
CN    204595412 U    8/2015
(Continued)

OTHER PUBLICATIONS

International Search Report in corresponding International Patent Application No. PCT/CN2017/114751 dated Jun. 22, 2018, 4 pages.
(Continued)

*Primary Examiner* — Michelle M Iacoletti
*Assistant Examiner* — Christopher A Lamb, II
(74) *Attorney, Agent, or Firm* — Knobbe, Martens, Olson & Bear, LLP

(57)    ABSTRACT

The light source system includes a first light source, a light splitting device, a wavelength conversion device, and a light guiding device. The first light source emits first light. The wavelength conversion device includes at least a first color light region and a second color light region, which are sequentially inserted into an outgoing path of the first light. The first color light region emits second light excited by the first light to the light splitting device. The second color light region reflects the first light to the light splitting device. The light splitting device directs one of the first light and the second light to a light path and directs the other to the light guiding device. The first light or the second light is reflected by the light guiding device to the light splitting device, and then is guided to the light path by the light splitting device.

20 Claims, 9 Drawing Sheets

(56) References Cited

U.S. PATENT DOCUMENTS

2015/0167907 A1* 6/2015 Hoehmann ............. F21V 13/14
362/84
2015/0362830 A1* 12/2015 Liao .................... G03B 21/204
353/31

FOREIGN PATENT DOCUMENTS

| CN | 105278226 A | 1/2016 |
| CN | 105652572 A | 6/2016 |
| CN | 107037680 A | 8/2017 |

OTHER PUBLICATIONS

Chinese Office Action issued in application No. 201710881536.2 dated Jul. 27, 2020.

* cited by examiner

LIGHT SOURCE SYSTEM AND PROJECTION SYSTEM USING SAME

CROSS REFERENCE TO RELATED APPLICATIONS

This is a U.S. National Stage Application, filed under 35 U.S.C. 371, of International Patent Application No. PCT/CN2017/114751, filed on Dec. 6, 2017, which claims priority to Chinese patent application No. 201710881536.2 filed on Sep. 26, 2017, contents of both of which are incorporated herein by reference in their entireties.

TECHNICAL FIELD

The present disclosure relates to the field of projection display, and in particular, to a light source system and a projection system using the light source system.

BACKGROUND

Currently, a spatial light modulator is widely used in the field of projection display. The spatial light modulator generally includes an LCD, an LCOS, a DMD, etc. A monolithic spatial light modulator projection system implements colorful projection display based on primary color lights that are switched according to a timing sequence. Due to characteristics such as a simple structure and low cost, the monolithic spatial light modulator projection system is widely used in the low-end market and the mid-range market. In terms of a light source of the projection system, the U.S. Pat. No. 7,547,114B2 provides a method of using a semiconductor laser to excite different phosphor color segments on a color wheel so as to form different primary color lights. This method has the advantages of high light efficiency and small optical etendue, so it has been developed rapidly and becomes an ideal choice for a light source of a projector. Since excited light generated by exciting the phosphor has a wide spectral bandwidth, a filter is typically added in the light source to obtain a required waveband, such as obtaining green or red light from yellow fluorescence.

SUMMARY

Technical Problem

With the rapid development of laser phosphor technology, there has been a gradual improvement in fluorescent efficiency and color purity. Commonly used phosphors include yellow phosphor, green phosphor, and red phosphor, among which technologies of the yellow phosphor and green phosphor are relatively mature, but the red phosphor has a quite severe saturation phenomenon. That is, when power of the excitation light is increased, the excitation efficiency of the red phosphor decreases, the emission spectrum shifts, and the color purity decreases. Therefore, the commonly used means of obtaining red light is to obtain a red light waveband from the yellow fluorescence through a filter.

Please refer to FIG. 1, which shows an existing light source system with two color wheels (a color wheel and a filter wheel), the light source system includes an excitation light source 101, a light splitter 102, a collection system 103, a phosphor wheel 104, a filter wheel 105, a blue light relay lens 106, a control device 107 and a light homogenizing rod 108. The excitation light source 101 is typically a blue light laser and emits a laser beam transmitted through the light splitter 102, and the light splitter 102 is a dichroic film transmitting blue light and reflecting yellow light. The laser beam is converged to a surface of the color wheel 104 through the collection lens 103 and excites the phosphor on the color wheel 104 to generate excited light which is reflected in a form of Lambertian light, collected by the collection lens 103, then reflected by the light splitter 102, and then is converged to the light homogenizing rod 108 through a relay lens. The filter wheel 105 performs a color modification on the excited light.

The structures of the color wheel 104 and the filter wheel 105 are shown in FIG. 2. Phosphor regions R, G and B of the color wheel 104 respectively correspond to filter regions R, G and B of the filter wheel 10. The control device 107 is configured to perform a synchronous control between the color wheel 104 and the filter wheel 105.

For blue light, the excitation light transmits through the region B of the color wheel 104, is incident to the light splitter 102 via the relay of the blue light relay system 106, transmits through the light splitter 102 to combine with the fluorescence in fluorescent light path, and then enters the light homogenizing rod 108. A diffusion sheet is disposed in the region B of the filter wheel 105 to increase an angle of the blue light and to perform decoherence.

Please refer to FIG. 3 which shows an existing light source system with a single color wheel, the light source system includes an excitation light source 201, an area light splitting sheet 202, a collection system 203, a color wheel 204 and a light homogenizing rod 205. A structure of the color wheel 204 is shown in FIG. 4. Different from the two color wheels used in FIG. 1, the color wheel 204 is provided with both of a phosphor region 2041 and a filter region 2042, and thus a device or program for a synchronous control is not required. Moreover, scattering powders are typically provided in a region B of the phosphor region 2041. The excitation light is scattered by the scattering powders and is reflected in a form of Lambertian light, and coincides with the fluorescence in fluorescent light path. However, a central area of the area light splitting sheet 202 is coated with a film transmitting blue light and reflecting yellow light while the outside area is a total reflection mirror. Thus, the blue light reflected by the color wheel 204 has a loss of light efficiency at the area light splitting sheet 202.

In terms of structure, since the phosphor region 2041 and the filter region 2042 are both provided on the color wheel 204, a diameter of the color wheel 204 will be much larger than that of the lens, and thus the overall volume of the light source will be limited by the diameter of the color wheel 204, and the light source cannot be made ultra-thin.

In summary, avoiding the use of the filter wheel based on the state of the art needs to consider not only the color purity of the phosphor emission spectrum, but also decoherence and increasing the optical etendue of the blue light.

Solution to the Problem

Technical Solution

In view of the above, the present disclosure provides a projection system and a light source system without a filter wheel.

In one aspect, the present disclosure provides a light source system including a first light source, a light splitting device, a wavelength conversion device, and a light guiding device. The first light source is configured to emit first light. The wavelength conversion device includes at least a first color light region and a second color light region. The first color light region and the second color light region are alternately inserted into an outgoing path of the first light according to a timing sequence. The first color light region is configured to generate second light under excitation of the first light and to emit the second light to the light splitting device. The second color light region is configured to reflect the first light to the light splitting device. The light splitting device is configured to guide the first light to a light path and to guide the second light to the light guiding device, or the light splitting device is configured to guide the second light to the light path and to guide the first light to the light guiding device. The light guiding device is configured to reflect the first light or the second light to the light splitting device which guides the first light or the second light to the light path.

In another aspect, the present disclosure further provides a projection system. The projection system includes the above light source system, a spatial light modulator and a projection lens. The unit-typed spatial light modulator is configured to modulate a light beam emitted from the light source system into image light carrying image information, and the image light is projected to a screen through the projection lens.

Beneficial Effects

Advantages of the light source system and the projection system provided by the embodiments of the present disclosure are as follows. The use of filter wheel is avoided. Under a low power, a better color purity can be obtained by using a green phosphor and a red phosphor. Under a high power, a better color and brightness requirement can still be achieved through adding a red laser light to combine with red fluorescence, and/or adding a green laser light to combine with green fluorescence. Furthermore, since the use of the filter wheel can be avoided, structurally, the volume of the light source is reduced, and the light source can be small, compact and ultra-thin. In terms of consistency of the light source, the filter used by the filter wheel has a coating tolerances (usually +/−5 to 8 nm), which will affect the consistency of brightness and color, so removing the filter wheel greatly improves the consistency of brightness and color of the light source, reduces the phenomenon that the light source system is out of specifications and the yield is low due to the coating tolerance of the filter, and reduces the difficulty in producing the light source system. In terms of control, compared with the dual color wheel system including the phosphor wheel and the filter wheel, the light source system of the present disclosure does not require the synchronous control to the color wheels, thereby reducing the difficulty.

BRIEF DESCRIPTION OF DORIGINALINGS

DESCRIPTION OF EMBODIMENTS

Embodiments of the Present Invention

Detailed Embodiments

Hereinafter, technical solutions in the embodiments of the present disclosure will be clearly and completely described with reference to the drawings in the embodiments of the present disclosure. It is apparent that the described embodiments are only parts of the embodiments of the present disclosure but not all of the embodiments. All other embodiments obtained by those skilled in the art based on the embodiments of the present disclosure without creative efforts shall fall into the protection scope of the present disclosure.

All technical and scientific terms used herein have the same meaning as commonly understood by those skilled in the art to which this present disclosure belongs, unless otherwise defined. The term "or/and" as used herein includes any and all combinations of one or more of the associated listed items.

Figure 1:
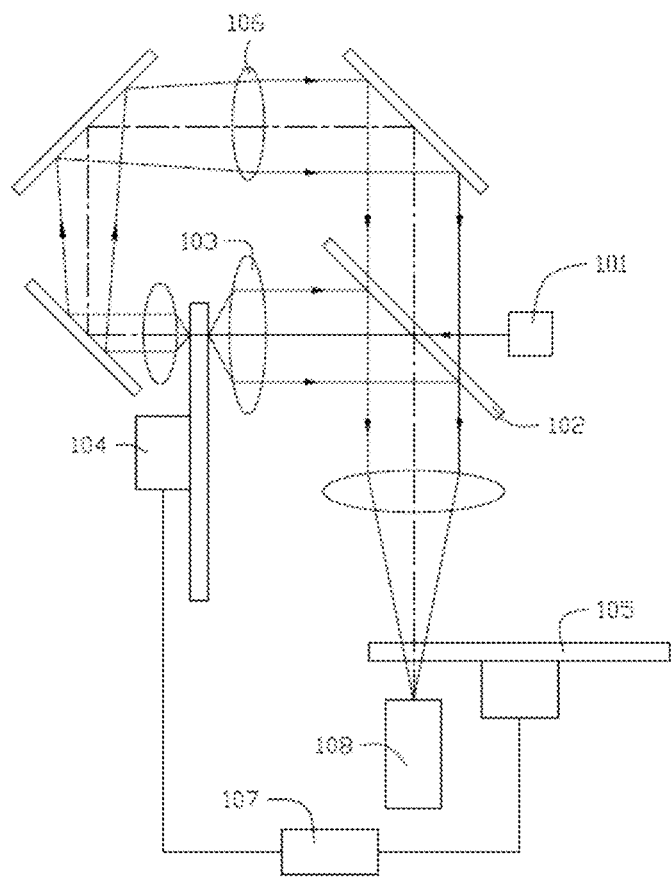
FIG. 1 is a specific diagram showing a light source system with two color wheels in the prior art.
Figure 2:
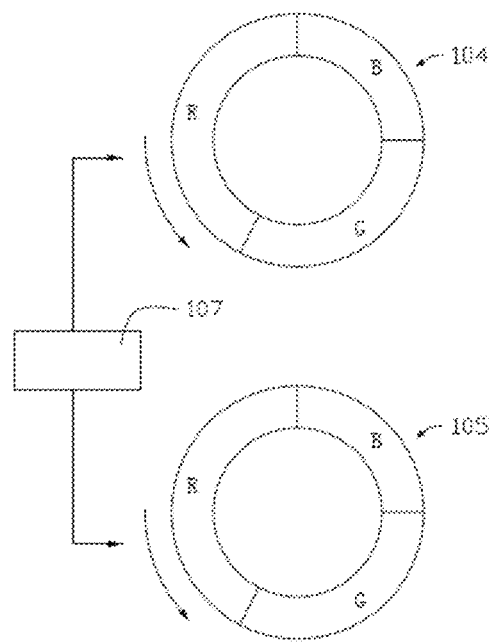
FIG. 2 is a schematic diagram showing segments of a color wheel and a filter wheel of the light source system shown in FIG. 1.
Figure 3:
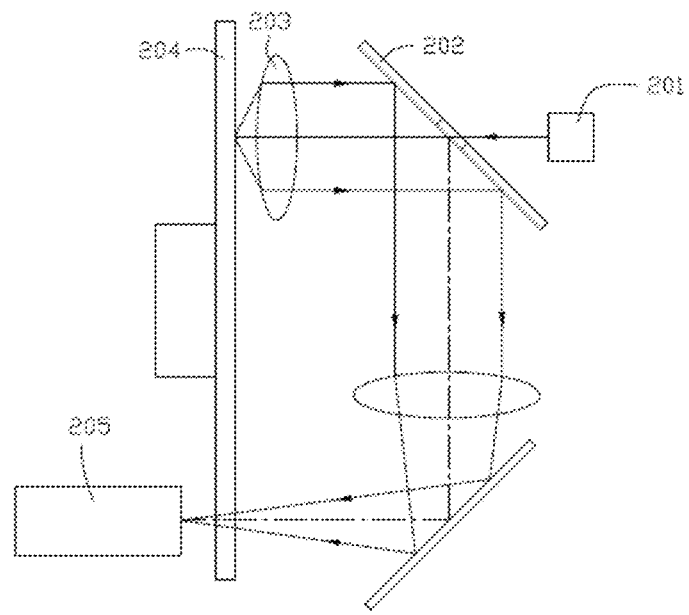
FIG. 3 is a specific diagram showing a light source system with one single color wheel in the prior art.
Figure 4:
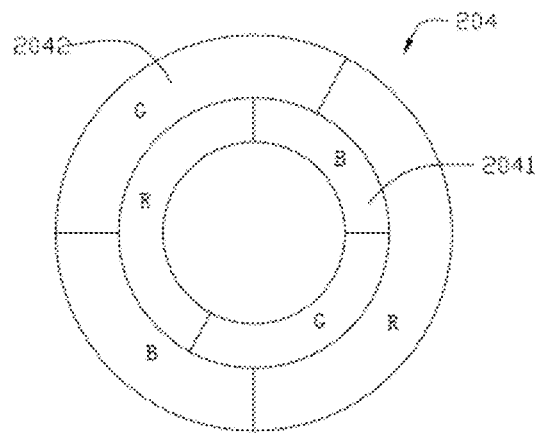
FIG. 4 is a schematic diagram showing segments of a color wheel of the light source system shown in FIG. 3.
Figure 5:
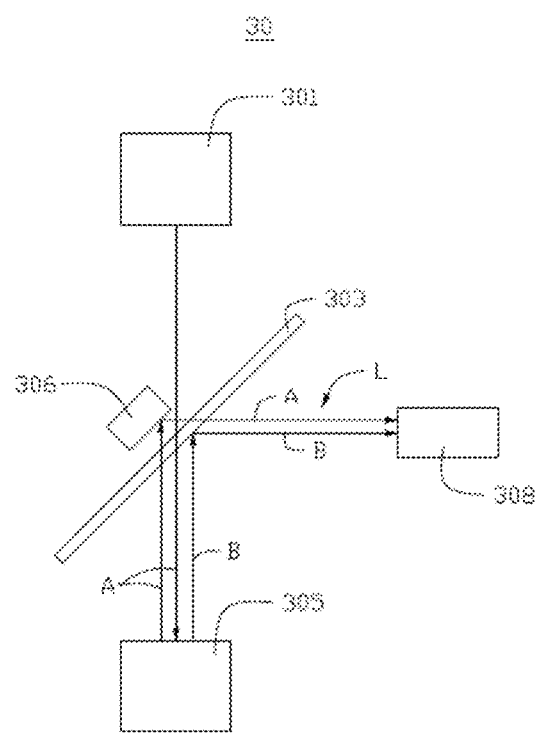
FIG. 5 is a block schematic diagram of a light source system according to a first embodiment of the present disclosure.

Please refer to FIG. 5, which is a block diagram of a light source system according to a first embodiment of the present disclosure. The light source system 30 includes a light source 301, a light splitting device 303, a wavelength conversion device 305, a light guiding device 306, and a light homogenizing device 308. The light source system 30 emits first light A. The first light A is guided to the wavelength conversion device 305 via the light splitting device 303. The wavelength conversion device 305 includes at least a first color light region and a second color light region. The first color light region and the second color light region are controlled to alternately come into an outgoing path of the first light A according to a timing sequence. After the first color region comes into the outgoing path of the first light A, the first color region absorbs the first light A and generates second light B, and the second light B is emitted to the light splitting device 303 and guided to a light path L by the light splitting device 303, and is emitted to the light homogenizing device 308 along the light path L. After the second color light region comes into the outgoing path of the first light A, the first light A is reflected by the second color light region to the light splitting device 303, is guided to the light guiding device 306 by the light splitting device 303, and is reflected to the light splitting device 303 by the light guiding device 306, is guided to the light path L by the light splitting device 303, and then is emitted to the light homogenizing device 308 along the light path L. The light homogenizing device 308 homogenizes the received first light A and the second light B and then emits the homogenized first light A and second light B.

Figure 6:
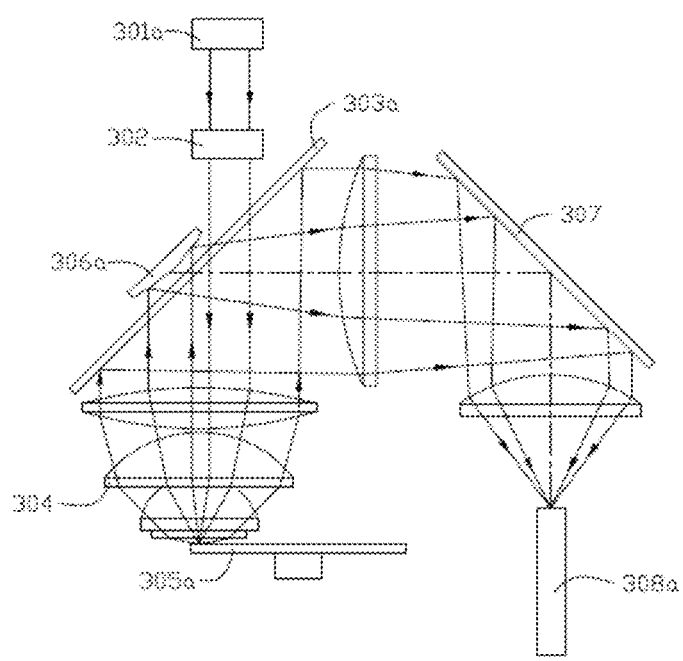
FIG. 6 is a specific diagram showing the light source system shown in FIG. 5.

Please refer to FIG. 6, which is a specific diagram showing the light source system 30. In this specific embodiment, the light source 301 is a blue-laser light source 301a emitting a blue laser light. The light splitting device 303 is a dichroic film transmitting blue light and reflecting yellow light, i.e., a film 303a transmitting blue light and reflecting yellow light. The wavelength conversion device 305 is a phosphor wheel 305a. The light guiding device 306 is a device 306a reflecting blue light. The light homogenizing device 308 is a light homogenizing rod 308a. In addition, the light source system 30 further includes a light homogenizing device 302, a light collection system 304 and a reflective device 307. The light homogenizing device 302 is disposed between the blue-laser light source 301a and the film 303a transmitting blue light and reflecting yellow light. The light collection system 304 is disposed between the film 303a transmitting blue light and reflecting yellow light and the phosphor wheel 305a. The reflective device 307 is disposed on the light path L.

Figure 7:
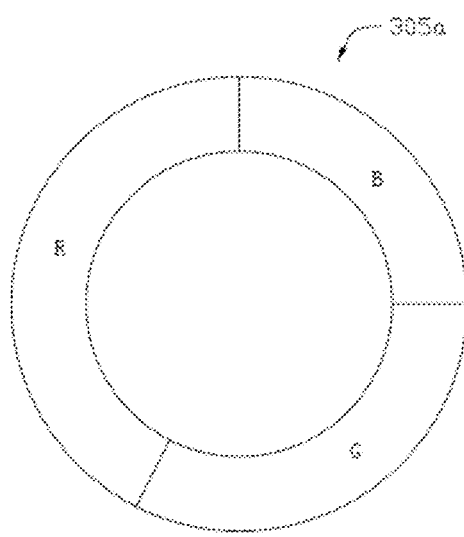
FIG. 7 is a schematic diagram showing segments of a phosphor wheel shown in FIG. 5.

After passing through the light homogenizing device 302, the blue laser light emitted by the blue-laser light source 301a transmits through the film 303a transmitting blue light and reflecting yellow light. The transmitted blue laser light is converged to a surface of the phosphor wheel 305a by the light collection system 304. Please refer to FIG. 7. The phosphor wheel 305a is divided into three color light regions in its circumferential direction, which include a red light region R, a green light region G, and a blue light region B. The red light region R and the green light region G are respectively provided with red phosphor and green phosphor. The blue light region B is provided with a reflective diffusion sheet. It can be understood that, in other embodiments, the phosphor wheel 305a can include more than one red light regions R, more than one green light regions G or more than one blue light regions B in its circumferential direction.

The phosphor wheel 305a is driven to rotate such that the red light region R, the green light region G and the blue light region B alternately are alternately inserted into the outgoing path of the blue laser light according to a timing sequence. When the phosphor wheel 305a is rotated to the turn of the red light region R, the red phosphor in the red light region R is excited by the blue laser light to generate red fluorescence. When the phosphor wheel 305a is rotated to the turn of the green light region G, the green phosphor in the green light region G is excited by the blue laser light to generate green fluorescence. The red fluorescence and the green fluorescence are reflected in a form of Lambertian light, and are reflected to the reflective device 307 by the film 303a transmitting blue light and reflecting yellow light after being collected by the light collection system 304, and are converged to an entrance of the light homogenizing rod 308a by the reflective device 307. When the phosphor wheel 305a is rotated to the turn of the blue light region B, the blue laser light is diffused and reflected in a light distribution of Gaussian by the diffusion sheet arranged in the blue light region B and coherence is suppressed. After being collected by the light collection system 304, the reflected blue laser light transmits through the film 303a transmitting blue light and reflecting yellow light to the device 306a reflecting blue light. The device 306a reflecting blue light is a reflective convex lens. The blue laser light is diffused at a certain angle after being reflected by the device 306a reflecting blue light, is transmitted to the reflective device 307 by the film 303a transmitting blue light and reflecting yellow light, and then is converged to the entrance of the light homogenizing rod 308a by the reflective device 307.

Figure 8:
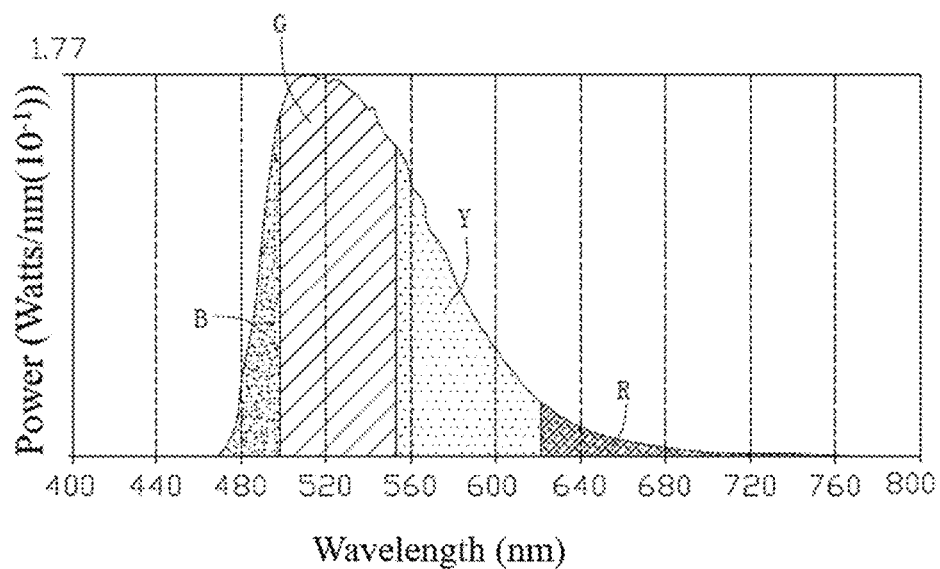
FIG. 8 is a spectral chart of green light emitted by the light source system shown in FIG. 5 at low power.
Figure 9:
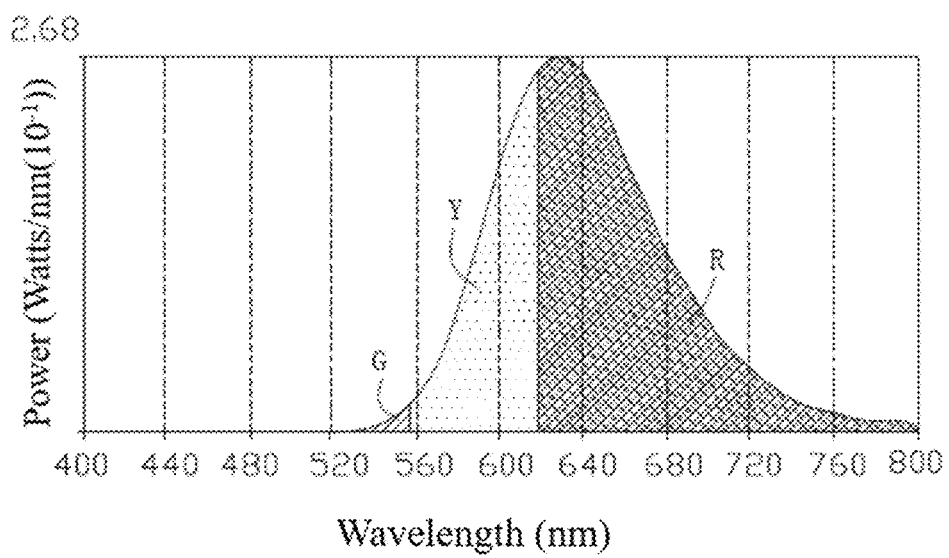
FIG. 9 is a spectral chart of red light emitted by the light source system shown in FIG. 5 at low power.
Figure 10:
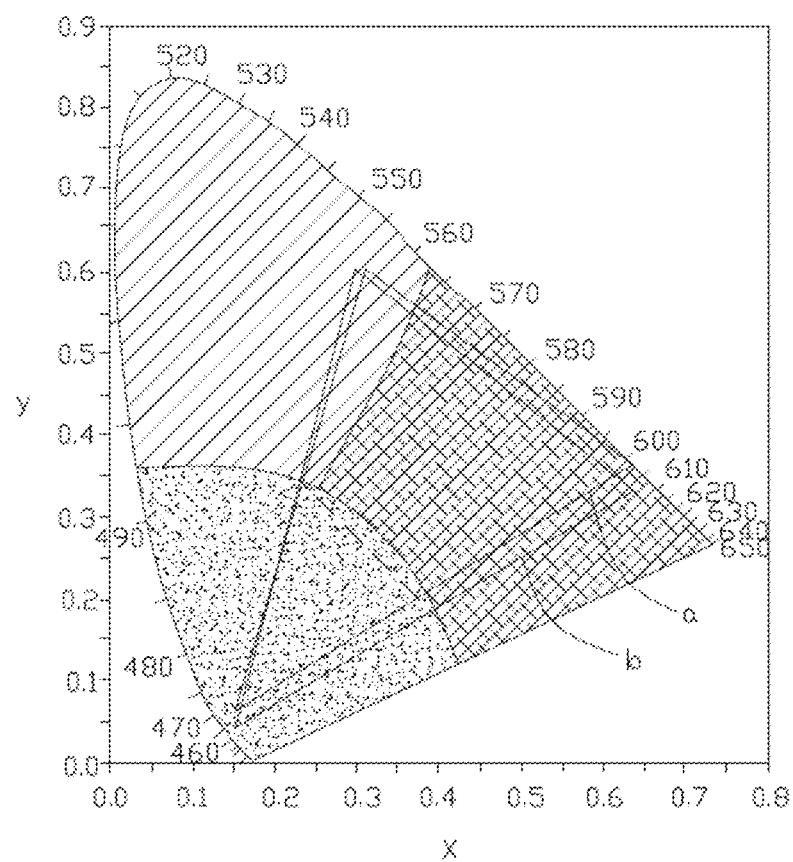
FIG. 10 is a color gamut diagram of light emitted by the light source system shown in FIG. 5 at low power.

Please refer to FIG. 8 and FIG. 10. FIG. 10aa is a color gamut diagram of the light source system 30 and FIG. 10b is a color gamut diagram defined in the international standard Rec.709. Since the green phosphor itself can provide an emission spectrum with a better color purity, the green fluorescence generated by exciting the green phosphor on the phosphor wheel 305a can meet requirements for most projection devices without filtering. Please refer to FIG. 9 and FIG. 10. The red phosphor does not saturate under a low excitation light power, and in this instance, an efficiency of obtaining red light from the red phosphor is higher than that from the yellow phosphor, and the color purity is better. Thus, under the low excitation light power, the red phosphor can be used without the filter. As for blue light, the diffusion sheet provided in the blue light region B of the phosphor wheel 305a can not only increase the etendue of the blue light but also perform the decoherence. In addition, the angle of the blue light is further increased after passing through the device 306a reflecting blue light, such that the angle of the blue light reaching the entrance of the light homogenizing rod 308a can match with those of the red light and the green light, thereby achieving a better uniformity. Consequently, compared with the existing light source system with one single color wheel, the light source system of the present disclosure reasonably utilizes the characteristics of small etendue of the blue laser light, which avoids the blue light loss caused by the area coating of the existing light source system with one single color wheel, and improves the uniformity of the light source.

Please refer to FIG. 10. The color gamut of the light source system 30 under the low excitation light power is close to that of the international standard Rec.709 and can satisfy needs of many projection devices.

It can be understood that in other embodiments, as the position where the light homogenizing device 308 is located is different, another light guiding device can be disposed between the light splitting device 303 and the light homogenizing device 308 to replace the reflective device 307.

It can be understood in other embodiments, as the position where the light source 301 is located is different, the light splitting device 303 can be a dichroic film reflecting blue light and transmitting yellow light, the red light and the green light generated from the phosphor wheel 305a which is excited by the blue laser light transmit through the light splitting device 303 to the light guiding device 306. The light guiding device 306 reflects the red light and the green light, such that the red light and the green light further transmit through the light splitting device 303 and finally are guided to the light homogenizing device 308.

It can be understood that in other embodiments, the light guiding device 306 can be a reflective diffusion sheet or a single fly-eye.

It can be understood that in other embodiments, the light homogenizing device 302 can be omitted.

Figure 11:
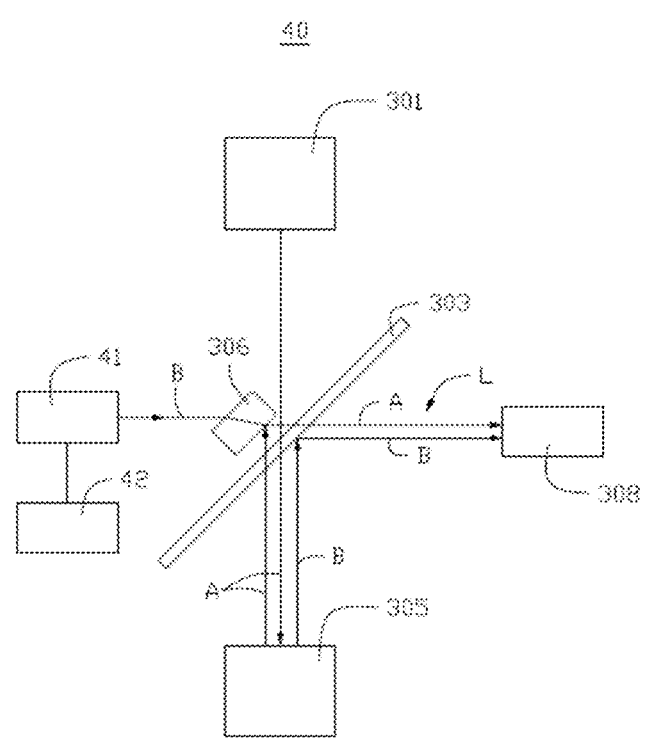
FIG. 11 is a block schematic diagram of a light source system according to a second embodiment of the present disclosure.

Please refer to FIG. 11 which is a block schematic diagram of a light source system according to a second embodiment of the present disclosure. Compared with the light source system 30, the light source system 40 includes an additional light compensation device 41i. The light compensation device 41 provides compensatory light to make up the deficiency of the second light B in color and brightness. In the present embodiment, the light compensation device 41 is disposed on a side of the light guiding device 306 facing away from the light splitting device 303, and the second light B provided by the light compensation device 41 is converged by the light guiding device 306 and then reaches the light splitting device 303. A structure allowing the second light B to pass through is provided at the light splitting device 303 corresponding to the incident position of the second light B provided by the light compensation device 41. For example, a film allowing the second light B to pass through is provided, such that the second light B provided by the light compensation device 41 passes through the light splitting device 303 and is combined with the second light B generated by the wavelength conversion device 305, and they are finally converged to the entrance of the light homogenizing device 308. In the present embodiment, parts that are the same as or similar to the components in the light source system 30 are denoted by the same reference numerals, and their functions are not repeated herein.

Figure 12:
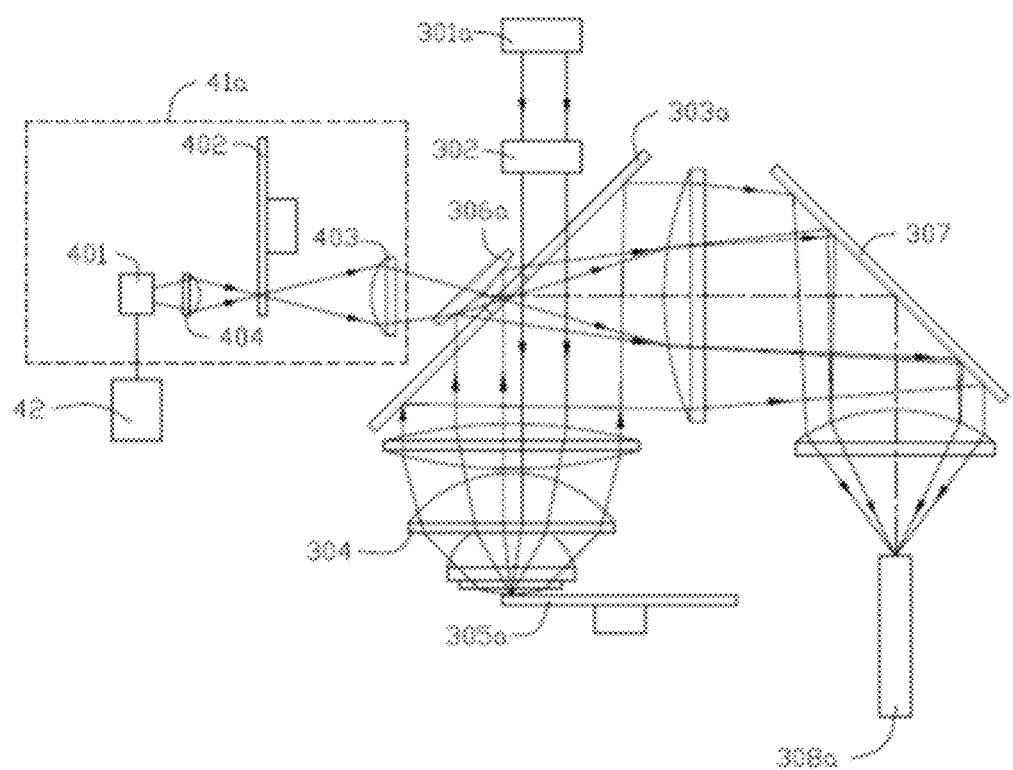
FIG. 12 is a specific diagram showing the light source system shown in FIG. 11.

Please refer to FIG. 12 which shows a specific diagram of the light source system 40. In the case where the excitation light power is increased, for example, for a projection device with a high brightness requirement, the saturation phenomenon of red phosphor is severe under a high power, so that the efficiency of exciting the red phosphor with a relatively high power decreases and the emission spectrum of the red phosphor shifts to a short wavelength band, which is not beneficial to obtaining the red light with required brightness and color. Therefore, in the present embodiment, the light compensation device 41 is a red-light compensation device 41a. The red laser light provided by the red-light compensation device 41a is incident to the film 303a transmitting blue light and reflecting yellow light through the light guiding device 306a. The film 303a transmitting blue light and reflecting yellow light is provided with a film transmitting yellow light or a film transmitting red light at a position corresponding to the incident position of the red laser light, such that the red laser light can transmit through the film 303a transmitting blue light and reflecting yellow light, is combined with the red fluorescence, and is finally converged to the entrance of the light homogenizing rod 308a.

In the present embodiment, the red-light compensation device 41a includes a red-laser light source 401, a scattering device 402, convergent lenses 403 and 404. The red laser light emitted by the red-laser light source 401 is converged to the scattering device 402 by the convergent lens 404. The scattering device 402 performs homogenization and decoherence on the red laser light so as to increase its optical etendue, such that the red laser light can match with the red fluorescence better. The scattering device 402 can be a scattering wheel. The red laser light on which the homogenization and decoherence have been performed is converged with a certain angel to the light guiding device 306 by the convergent lens 403. The red laser light is further converged by the light guiding device 306, such that the red laser light forms a relatively small light spot, thereby reducing an area of the film transmitting yellow light or the film transmitting red light provided on the film 303a transmitting blue light and reflecting yellow light and further reducing the loss of the red fluorescence.

In the present embodiment, the light source system 40 further includes a control device 42. The control device 42 controls to turn on or turn off the red-light compensation device 41 based on rotation information of the phosphor wheel 305a. Further, the control device 42 controls to turn on the red-laser light source 401 only when the phosphor wheel 305a is rotated to the turn of the red light region R and controls to turn off the red-laser light source 401 on other time.

In the present embodiment, by mixing the red laser light into the red fluorescence, the deficiencies of brightness and color of red light comprising only red fluorescence under a high excitation light power is compensated since the red laser light has better monochromaticity and color purity.

Figure 13:
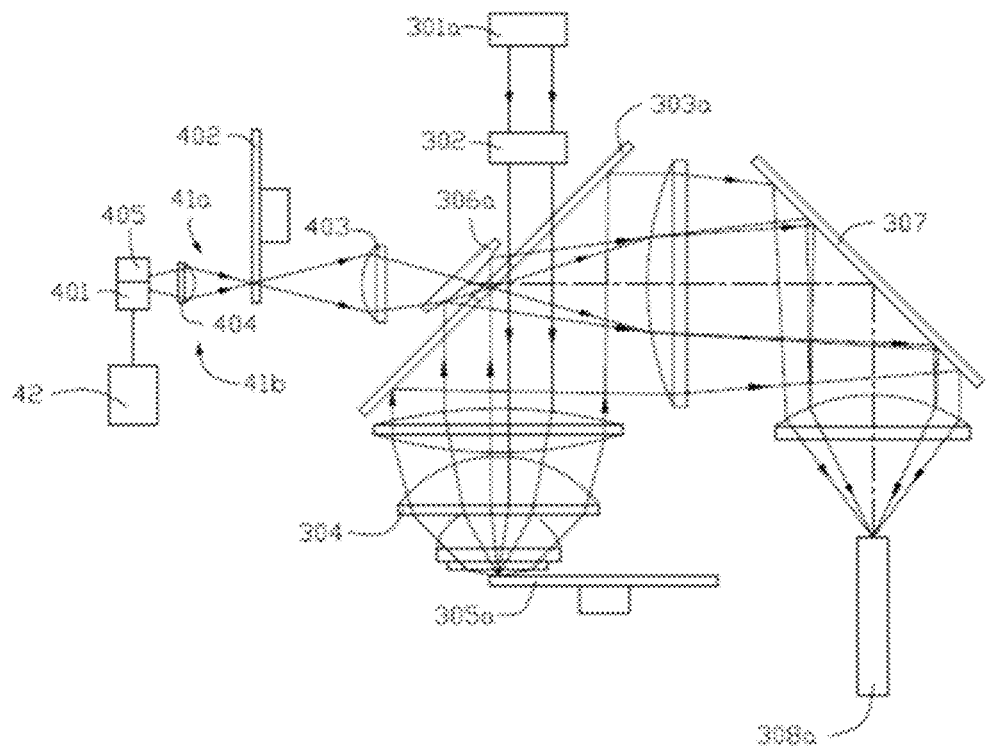
FIG. 13 is another specific diagram showing the light source system shown in FIG. 11.

It should be understood that in some embodiments, for example, to achieve a wider color gamut and to improve the color of green light on demands, the light compensation device 41 can include both the red-light compensation device 41a and a green-light compensation device 41b. Please refer to FIG. 13. The green-light compensation device 41b includes a green-laser light source 405 for emitting green laser light. and the scattering device 402, the convergent lenses 403 and 404 shared with the red-light compensation device 41a. A film 303a transmitting yellow light is provided at the film transmitting blue light and reflecting yellow light corresponding to incident positions of the red laser light and the green laser light so as to allow those to pass through the film 303a transmitting blue light and reflecting yellow light. In addition, the control device 42 is further configured to control to turn on or turn off the green light compensation device 41b t based on the rotation information of the phosphor wheel 305a. Furthermore, the control device 42 controls to turn on the green-laser light source 405 to be turned on only when the phosphor wheel 305a is rotated to the turn of the green light region G, and controls to turn it off on other time.

It can be understood that in some embodiments, the light compensation device 41 can include only the green-light compensation device 41b on demand.

It can be understood that in some embodiments, the control device 42 can further dynamically adjust, according to a control instruction, power of the red laser light emitted by the red-laser light source 401 and/or that of the green laser light emitted by the green-laser light source 405 so as to dynamically adjust the color and brightness of the red light and/or green light emitted from the light source system 40. The control instruction can be an instruction inputted by a user or an instruction from another control device.

It can understood that in some embodiment, the control device 42 can be further configured to dynamically adjust intensity of the first light A emitted from the light source 301 according to the control instruction. For example, the control device 42 dynamically adjusts the power of the blue laser light emitted by the blue-laser light source 301a according to the control instruction, so as to generally adjust the color and brightness of the whole light source system 40.

Although the above illustrates that one same control device 42 is used to simultaneously control the on/off state and the power of the emitted laser light of the blue-laser light source 301a, the red-laser light source 401, and/or the green-laser light source 405. It can be understood that in some embodiments, the on/off state and the power of the emitted laser light of the blue-laser light source 301a, the red-laser light source 401, and/or the green-laser light source 405 can be achieved by different control devices.

Figure 14:
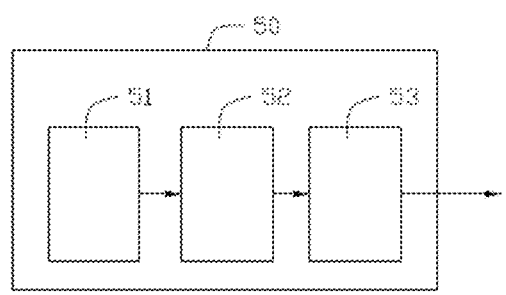
FIG. 14 is a block schematic diagram of a projection system according to an embodiment of the present disclosure.

Please refer to FIG. 14 which is a block schematic diagram of a projection system according to an embodiment of the present disclosure. The projection system 50 includes a light source system 51, a spatial light modulator 52 and a projection lens 53. The light source system 51 can be any light source system described in the above embodiments, or a light source system which is obtained by appropriate modification based on the above light source system without departing from the scope of the present disclosure. The spatial light modulator 52 is configured to modulate a light beam emitted from the light source system 51 into image light carrying image information, and the image light is projected to a screen (not shown in figures) via the projection lens 53.

In view of above, the light source system and projection system provided by embodiments of the present disclosure avoid the use of the filter wheel. A better color purity can be obtained by using the green phosphor and the red phosphor under the low power. Under the high power, better color and brightness requirements can still be achieved through adding red laser light to combine with the red fluorescence, and/or adding green laser light to combine with the green fluorescence. Furthermore, since the use of the filter wheel can be avoided, structurally, the volume of the light source is reduced, and the light source can be small, compact and ultra-thin. In terms of consistency of the light source, the filter used by the filter wheel has the coating tolerances (usually +/−5 to 8 nm), which will affect the consistency of brightness and color, so removing the filter wheel greatly improves the consistency of brightness and color of the light source, reduces the phenomenon that the light source system is out of specifications and the yield is low due to the coating tolerance of the filter, and reduces the difficulty in producing the light source system. In terms of control, compared with the dual color wheel system including the phosphor wheel and the filter wheel, the light source system of the present disclosure does not require synchronous control of the color wheels, thereby reducing the difficulty.

The above embodiments merely illustrates the technical solution of the present disclosure, and thus does not limit the present disclosure. Although preferred embodiments of the present disclosure have been described in detail, for those skilled in the art, it should be understood that any modification and equivalent replacement can be made to the present disclosure without departing from the spirit and scope of the solutions of present disclosure.

What is claimed is:

1. A light source system, comprising:
   a first light source configured to emit first light;
   a light splitting device;
   a wavelength conversion device comprising at least a first color light region and a second color light region which are alternately inserted into an outgoing path of the first light according to a timing sequence, wherein the first color light region is configured to generate second light under excitation of the first light and to emit the second light to the light splitting device, and the second color light region is configured to reflect the first light to the light splitting device;
   a light guiding device, wherein the light splitting device is configured to guide the first light to the light guiding device and to guide the second light to a light path, the light guiding device is configured to reflect the first light to the light splitting device, and the reflected first light is guided to the light path by the light splitting device; and
   a light compensation device configured to compensate the second light and comprising a second light source, wherein the second light source is configured to emit the second light, the second light emitted by the second light source is converged by the light guiding device to the light splitting device which is provided, corresponding to an incident position of the second light emitted from the second light source, with a structure that allows the second light to pass through, and the second light emitted by the second light source transmits through the light splitting device and then is combined with the second light generated by the wavelength conversion device.

2. The light source system according to claim 1, further comprising a control device configured to control to turn on the second light source after the first color light region is inserted into the outgoing path of the first light and to turn off the second light source after the first color light region is out of the outgoing path of the first light.

3. The light source system according to claim 1, further comprising a light homogenizing device,
   wherein the wavelength conversion device further comprises a third color light region configured to generate third light under excitation of the first light and to emit the third light to the light splitting device, wherein the third color light region, the first color light region and the second color light region are alternately inserted into the outgoing path of the first light according to a timing sequence, and
   wherein the light splitting device guides the second light and the third light to the light path and guides the first light to the light guiding device, wherein the first light is reflected by the light guiding device to the light splitting device and then is guided to the light path by the light splitting device; and wherein the light homogenizing device receives the first light, the second light and the third light from the light path according to a timing sequence and then homogenizes the first light, the second light and the third light.

4. The light source system according to claim 1, wherein the light guiding device is a reflective convex lens, a reflective diffusion sheet or a single fly-eye.

5. The light source system according to claim 1, further comprising a light collection system configured to collect the second light generated by the wavelength conversion device and the first light reflected by the wavelength conversion device and transmit the first light and the second light to the light splitting device.

6. The light source system according to claim 1, further comprising a control device configured to dynamically adjust power of at least one of the second light source for emitting the second light and the first light source for emitting the first light based on an instruction inputted by a user or an instruction from another control device.

7. A light source system, comprising:
   a first light source configured to emit first light;
   a light splitting device;
   a wavelength conversion device comprising at least a first color light region and a second color light region which are alternately inserted into an outgoing path of the first light according to a timing sequence, wherein the first color light region is configured to generate second light under excitation of the first light and to emit the second light to the light splitting device, and the second color light region is configured to reflect the first light to the light splitting device; and
   a light guiding device,
   wherein the light splitting device is configured to guide the first light to the light guiding device and to guide the second light to a light path; and
   wherein the light guiding device is configured to reflect the first light to the light splitting device and to diffuse the first light so that the first light is diffused at a certain angle after being reflected by the light guiding device, and the reflected first light is guided to the light path by the light splitting device.

8. The light source system according to claim 7, further comprising a light homogenizing device and a light compensation device configured to compensate the second light and comprising a second light source, wherein the second light source is configured to emit the second light which is combined with the second light generated by the first color light region and then enter the light homogenizing device through the light path.

9. The light source system according to claim 8, wherein the second light emitted by the second light source is converged by the light guiding device to the light splitting device which is provided, corresponding to an incident position of the second light emitted from the second light source, with a structure that allows the second light to pass through, and the second light emitted by the second light source transmits through the light splitting device and then is combined with the second light generated by the wavelength conversion device.

10. The light source system according to claim 8, further comprising a control device configured to control to turn on the second light source after the first color light region is inserted into the outgoing path of the first light and to turn off the second light source after the first color light region is out of the outgoing path of the first light.

11. The light source system according to claim 8, further comprising a control device configured to dynamically adjust power of at least one of the second light source for emitting the second light and the first light source for emitting the first light based on an instruction inputted by a user or an instruction from another control device.

12. The light source system according to claim 7, further comprising a light homogenizing device,
wherein the wavelength conversion device further comprises a third color light region configured to generate third light under excitation of the first light and to emit the third light to the light splitting device, wherein the third color light region, the first color light region and the second color light region are alternately inserted into the outgoing path of the first light according to a timing sequence, and
wherein the light splitting device guides the second light and the third light to the light path and guides the first light to the light guiding device, wherein the first light is reflected by the light guiding device to the light splitting device and then is guided to the light path by the light splitting device; and
wherein the light homogenizing device receives the first light, the second light and the third light from the light path according to a timing sequence and then homogenizes the first light, the second light and the third light.

13. The light source system according to claim 7, wherein the light guiding device is a reflective convex lens, a reflective diffusion sheet or a single fly-eye.

14. The light source system according to claim 7, further comprising a light collection system configured to collect the second light generated by the wavelength conversion device and the first light reflected by the wavelength conversion device and transmit the first light and the second light to the light splitting device.

15. A projection system comprising a light source system, a spatial light modulator configured to modulate a light beam emitted from the light source system into image light carrying image information and a projection lens,
wherein the image light is projected to a screen via the projection lens; and
wherein the light source system comprises:
a first light source configured to emit first light;
a light splitting device;
a wavelength conversion device comprising at least a first color light region and a second color light region which are alternately inserted into an outgoing path of the first light according to a timing sequence, wherein the first color light region is configured to generate second light under excitation of the first light and to emit the second light to the light splitting device, and the second color light region is configured to reflect the first light to the light splitting device;
a light guiding device, wherein the light splitting device is configured to guide the first light to the light guiding device and to guide the second light to a light path, the light guiding device is configured to reflect the first light to the light splitting device, and the reflected first light is guided to the light path by the light splitting device; and
a light compensation device configured to compensate the second light and comprising a second light source, wherein the second light source is configured to emit the second light, the second light emitted by the second light source is converged by the light guiding device to the light splitting device which is provided, corresponding to an incident position of the second light emitted from the second light source, with a structure that allows the second light to pass through, and the second light emitted by the second light source transmits through the light splitting device and then is combined with the second light generated by the wavelength conversion device.

16. The projection system according to claim 15, wherein the light source system further comprises a light homogenizing device,
wherein the wavelength conversion device further comprises a third color light region configured to generate third light under excitation of the first light and to emit the third light to the light splitting device, wherein the third color light region, the first color light region and the second color light region are alternately inserted into the outgoing path of the first light according to a timing sequence, and
wherein the light splitting device guides the second light and the third light to the light path and guides the first light to the light guiding device, wherein the first light is reflected by the light guiding device to the light splitting device and then is guided to the light path by the light splitting device; and
wherein the light homogenizing device receives the first light, the second light and the third light from the light path according to a timing sequence and then homogenizes the first light, the second light and the third light.

17. The projection system according to claim 15, wherein the light guiding device is a reflective convex lens, a reflective diffusion sheet or a single fly-eye.

18. A projection system, comprising:
a light source system;
a spatial light modulator configured to modulate a light beam emitted from the light source system into image light carrying image information; and
a projection lens, wherein the image light is projected to a screen via the projection lens,
wherein the light source system comprises:
a first light source configured to emit first light;
a light splitting device;
a wavelength conversion device comprising at least a first color light region and a second color light region which are alternately inserted into an outgoing path of the first light according to a timing sequence, wherein the first color light region is configured to generate second light under excitation of the first light and to emit the second light to the light splitting device, and the second color light region is configured to reflect the first light to the light splitting device; and a light guiding device, wherein the light splitting device is configured to guide the first light to the light guiding device and to guide the second light to a light path; and wherein the light guiding device is configured to reflect the first light to the light splitting device and to diffuse the first light so that the first light is diffused at a certain angle after being reflected by the light guiding device, and the reflected first light is guided to the light path by the light splitting device.

19. The projection system according to claim 18, wherein the light source system further comprises a light homogenizing device, wherein the wavelength conversion device further comprises a third color light region configured to generate third light under excitation of the first light and to emit the third light to the light splitting device, wherein the third color light region, the first color light region and the second color light region are alternately inserted into the outgoing path of the first light according to a timing sequence, and wherein the light splitting device guides the second light and the third light to the light path and guides the first light to the light guiding device, wherein the first light is reflected by the light guiding device to the light splitting device and then is guided to the light path by the light splitting device; and wherein the light homogenizing device receives the first light, the second light and the third light from the light path according to a timing sequence and then homogenizes the first light, the second light and the third light.

20. The projection system according to claim 18, wherein the light guiding device is a reflective convex lens, a reflective diffusion sheet or a single fly-eye.

* * * * *